United States Patent [19]

Sakuragi et al.

[11] 4,375,314
[45] Mar. 1, 1983

[54] INFRARED OPTICAL FIBER

[75] Inventors: Shiro Sakuragi; Kyoshiro Imagawa; Mitsunori Saito, all of Kyoto, Japan

[73] Assignee: Agency of Industrial Science and Technology, Tokyo, Japan

[21] Appl. No.: 225,001

[22] Filed: Jan. 14, 1981

[30] Foreign Application Priority Data

Jan. 22, 1980 [JP] Japan ................................. 55-5317

[51] Int. Cl.³ ............................................... G02B 5/14
[52] U.S. Cl. .............................. 350/96.23; 350/96.29; 350/96.3
[58] Field of Search ................. 350/96.29, 96.3, 96.31, 350/96.32, 96.23, 96.1, 96.33, 96.34, 96.21, 96.22; 250/227

[56] References Cited

U.S. PATENT DOCUMENTS 3,712,705  1/1973  Marcatili ........................ 350/96.32
3,853,384  12/1974 Pinnow et al. ................... 350/96.33
4,226,504  10/1980 Bellino ........................... 350/96.23

FOREIGN PATENT DOCUMENTS 2504553  8/1976  Fed. Rep. of Germany ... 350/96.32

Primary Examiner—Marvin L. Nussbaum
Attorney, Agent, or Firm—Pearne, Gordon, Sessions, McCoy & Granger

[57] ABSTRACT

An optical fiber for infrared transmission constructed by winding a cladding around a core in the manner of a coil, the cladding having a refractive index lower than that of the core, a protective tube being employed to jacket the clad core.

5 Claims, 6 Drawing Figures (A)

(B)

INFRARED OPTICAL FIBER

BACKGROUND OF THE INVENTION

This invention relates to an easily manufactured infrared optical fiber capable of low-loss transmission of infrared light.

The core material employed in optical fibers for infrared transmission requires surface protection since it is soft and easily flawed. A conventional structure for realizing such surface protection is illustrated in FIG. 1, and comprising a cladding 2a of a polymer material which is used to clad a core 1a. This so-called "polymer-clad" fiber is well-known in the art, and is known to exhibit certain short-comings. Specifically, the surface of the core 1a is likely to be flawed as it is inserted into the polymer cladding 2a. If the core is to carry a high-power $CO_2$ or CO laser beam and the laser beam should happen to leak into the polymer cladding 2a from the core 1a, a dangerous situation could arise in which the polymer cladding may burn due to the generation of heat. A number of arrangements have been proposed in an effort to preclude the aforesaid difficulty. One such arrangement is illustrated in FIG. 2 and makes use of spacers 1b which are disposed at suitable intervals axially of the core 1a between the core 1a and the polymer cladding 2a so as to prevent them from coming into contact, the spacers having a refractive index which is lower than that of the core 1a. The problem encountered in this case, however, is the great difficulty involved in manufacturing the optical fiber while at the same time maintaining the peculiar arrangement of the constituents without the surface of the core being flawed. It is not an overstatement to say that the manufacture of very long fibers having this structure is virtually impossible.

Another proposal, as shown in FIG. 3, contemplates an arrangement which is similar to that of the clad core structure employed in optical fibers made of glass, in that the core 1a is surrounded by a tubular cladding 2b the refractive index of which is lower than that of the core, the infrared light being made to reflect off the core-cladding interface as it propagates along the fiber, and in that the cladding 2b is surrounded by a polymer tube 3a to form a structure that protects both the core 1a and the cladding 2b. In a fiber of this structure which relies upon a metallic halide, however, it is not possible to avoid the scattering loss of infrared light attributed to abrasion at the core-cladding interface even if the fiber is fabricated by an extrusion process. To be more specific, the clad core structure can be manufactured with facility by a drawing technique if the core is made of sillica glass or a like material, but the drawing process cannot be applied to the production of optical fibers that transmit infrared light because such fibers employ a core material which has a low viscosity at its melting point.

In view of the above limitation, the process which has been adopted to manufacture the optical fiber having the structure illustrated in FIG. 3 includes two separate extrusion steps, one for manufacturing the core 1a and the other for manufacturing the tubular cladding 2b, with the formed core then being inserted into the completed cladding 2b. In practice, however, great difficulties are encountered when inserting the core 1a, having an extremely small diameter measured microns, into the cladding 2b, and when inserting the clad core into the protective polymer tube 3. The result is not only a low level of manufacturing efficiency but also unavoidable scattering loss of optical energy due to abrasion at the core-cladding interface caused by the sliding contact between them when the core 1a is inserted.

SUMMARY OF THE INVENTION

Accordingly, it is an object of the present invention to provide an infrared optical fiber having a structure devoid of the abovesaid short-comings in order to permit low-loss transmission of infrared light.

According to the present invention, the foregoing and other objects are obtained by providing an infrared optical fiber structure having an infrared light-transmitting core around whose outer periphery is wound, in coil-like fashion, a cladding of a refractive index lower than that of the core, the core with the wound cladding being jacketed by a protective tube.

Other features and advantages of the invention will be apparent from the following description taken in connection with the accompanying drawings.

DETAILED DESCRIPTION OF THE PREFERRED EMBODIMENT

Figure 1:
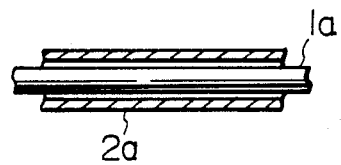
FIGS. 1, 2 and 3 are cross-sectional views of optical fiber structures according to the prior art.
Figure 2:
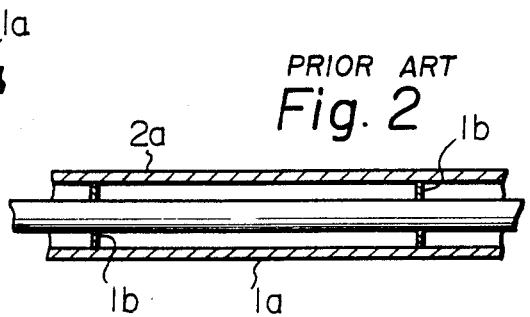
Figure 3:
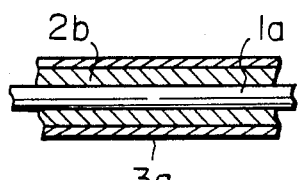
Figure 4:
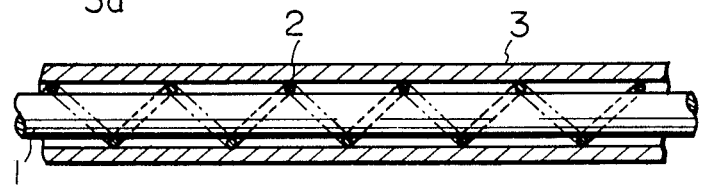
FIG. 4 is a cross-sectional view showing an embodiment of an infrared optical fiber in accordance with the present invention.

Referring first to FIG. 4, an infrared optical fiber in accordance with the present invention includes a core 1 for transmitting infrared light, a cladding 2 wound around the outer periphery of the core 1 in a coil-like configuration and having a refractive index lower than that of the core, and a protective polymer tube 3 which jackets the clad core. The material used for the core 1 can be any metallic halide selected from among such metallic halides as KRS-5, KRS-6, TlBr, TlCl and AgBr. The material for the cladding 2 can also be selected from among such metallic halides as AgCl, AgBr and TlBr, though the refractive index of the selected cladding material must be less than the refractive index of the core.

One exemplary method of manufacturing the optical fiber described above would be manufacturing the core 1 as by an extrusion process, forming a linear length of the cladding material by the same process used in producing the core, winding the cladding material on the core in the manner of a coil, and jacketing the clad core with the polymer tube 3.

Figure 5:
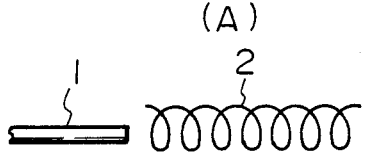
FIG. 5 shows schematic views useful in describing one example of a method of manufacturing the infrared optical fiber shown in FIG. 4.
Figure 5:
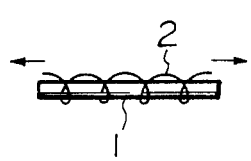

A more advantageous method of manufacturing the infrared optical fiber as embodied in FIG. 4 is illustrated in FIGS. 5A and 5B. As shown in FIG. 5A, the core 1 is manufactured by an extrusion process, and the linear length of cladding material is manufactured by a separate extrusion process. The cladding material is then fabricated by a suitable process, such as by winding it on a round rod having a diameter larger than that of the core, thereby to form the cladding 2 which will have a coiled configuration as a result of the fabrication step.

Next, the core 1 is inserted into the coiled cladding 2, as depicted in FIG. 5B, and the coiled cladding is then extended by pulling it from its ends so as to constrict the inner diameter of the coil. There is no possibility of the core surface being flawed during insertion because the inner diameter of the coiled cladding 2 is greater than the diameter of the core 1, and because of the softness of the cladding material. Moreover, constricting the diameter of the coiled cladding 2 after the introduction of the core 1 greatly facilitates the core insertion step. The insertion of the core 1 can be facilitated to an even greater degree if the total length of the cladding 2 is reduced by fabricating it into a coil whose windings have an extremely dense or substantially dense arrangement.

Jacketing the clad core with the polymer tube 3 completes the manufacture of the optical fiber for the transmission of infrared light. The completed structure, as shown in FIG. 4, protects the optical fiber against damage from external causes, against deformation, and against contamination due to the attachment of dust. While the surface of the coiled cladding 2 may be scratched to some extent due to sliding contact between it and the polymer tube 3 during the jacketing step, it should be noted that scratches at this portion of the fiber bear no relation to the infrared transmission characteristic. In addition, the jacketing step can be performed quickly and easily since the coiled cladding precludes contact between the core 1 and the polymer tube 3 over the entire length of the fiber.

The infrared optical fiber obtained as described above experiences no absorption losses from the core 1 into the coiled cladding 2 owing to the contact therebetween because the cladding 2 has a lower refractive index than the core 1. There is also no possibility of absorption losses attributable to contact between the core 1 and the polymer tube 3 since the coiled cladding 2 prevents such contact by functioning as a spacer. In addition, there is no scattering loss at the core-cladding interface because the core surface is not flawed during or after manufacture. These structural advantages provide an optical fiber with an excellent infrared transmission characteristic.

Figure 6:
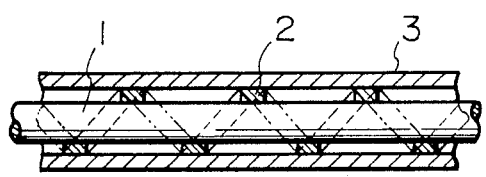
FIG. 6 is a cross-sectional view showing another embodiment of an infrared optical fiber in accordance with the present invention.

Another embodiment of the present invention, shown in FIG. 6, features a coiled cladding 2 having a flat, rather than a rounded cross-section. The optical fiber of FIG. 6 is structurally identical to that of the previous embodiment in all other aspects.

It should be apparent from the description of the foregoing embodiments that the present invention provides an optical fiber for infrared transmission with little cause for infrared loss by virtue of the characteristic structure wherein a coiled cladding is disposed around a core, the cladding having a lower refractive index than the core, and wherein a protective tube consisting of a polymer or the like is employed to jacket the clad core. A linear length of the cladding material can be wound directly on the core, or a method of manufacture can be adopted in which the core is passed through the cladding fabricated beforehand into a coiled shape, the coiled cladding then being extended to constrict its diameter. Employing such a method of manufacture permits the core to be positioned easily within the coiled cladding, and simplifies the production of the optical fiber.

As many apparently widely different embodiments of the present invention may be made without departing from the spirit and scope thereof, it is to be understood that the invention is not limited to the specific embodiments thereof except as defined in the appended claims.

What is claimed is:

1. An infrared optical fiber comprising a core for transmitting infrared light; a cladding being preassembled around said core with radial clearance in a coiled configuration and then tensioned to radially constrict the cladding into coiled engagement with the core; and a protective tube which jackets said core and said cladding coiled thereon.

2. An infrared optical fiber as set forth in claim 1, wherein said cladding is preshaped by helically winding it around a rod form having a diameter larger than the diameter of said core to provide said cladding upon removal of the rod form with a helically coiled configuration having a free diameter larger than the diameter of the core.

3. An infrared optical fiber as set forth in claim 1 wherein said cladding has a refractive index lower than that of said core.

4. A method of manufacturing an infrared optical fiber comprising the steps of winding a cladding material around a removable rod form having a diameter larger than that of a core to provide a coiled cladding having a free diameter larger than that of said core, inserting the core into the coiled cladding, extending the coiled cladding by pulling its end or ends to constrict the inner diameter of the coiled cladding and jacketing the cladded core with a polymer tube.

5. A method as set forth in claim 4 wherein the step of winding the coiled cladding includes disposing said cladding in a helical configuration about said rod form.

* * * * *